Feb. 11, 1964

S. H. AULD, JR 3,120,933

SIGNAL MIXING CIRCUIT

Filed Dec. 1, 1960

3 Sheets-Sheet 1

INVENTOR.
SAMUEL H. AULD Jr.
BY Mueller & Aichele
Attys.

INVENTOR.
SAMUEL H. AULD, Jr.
BY Mueller & Aichele
Attys.

Feb. 11, 1964 S. H. AULD, JR 3,120,933

SIGNAL MIXING CIRCUIT

Filed Dec. 1, 1960 3 Sheets-Sheet 3

INVENTOR.
SAMUEL H. AULD Jr.
BY Mueller & Aichele
Attys.

United States Patent Office 3,120,933
Patented Feb. 11, 1964

3,120,933

SIGNAL MIXING CIRCUIT

Samuel H. Auld, Jr., Woodland Hills, Calif., assignor, by mesne assignments, to The Bendix Corporation, Baltimore, Md., a corporation of Delaware Filed Dec. 1, 1960, Ser. No. 73,107
12 Claims. (Cl. 244—77)

This application relates generally to control systems which operate in response to a plurality of signals, and more particularly to a circuit which combines control signals which may be of different types, such as alternating current and direct current signals, to provide a combined control signal in which the effects of the individual signals are present in the desired proportions.

In many control systems it is desired to provide a control which responds to signals from a plurality of sources, so that the control represents a plurality of controlling factors. For example, an automatic pilot for an aircraft must respond to signals derived from the gyros in the aircraft, and from the radio equipment therein, and also to signals from manual controls which are set by the pilot. The control signals from these various sources have different characteristics and may be direct current signals or alternating current signals having various wave forms.

In the prior art it has been customary to convert various different control signals which are used together to a single form, with the converted signals being combined to provide a composite signal. However, this requires complex equipment to produce signals of the same form and which have the required relative effects in the composite signal. In addition to the problem of complexity of systems which process signals separately before they are combined, any change in the characteristics of the different processing circuits will change the relative values of the signals from the different sources, and the composite signal will not properly represent the various sources.

It is therefore an object of the present invention to provide an improved system for combining a plurality of control signals to produce a single composite control signal wherein the effect of the separate control signals are properly related.

Another object of the invention is to provide a simple and accurate circuit for combining a plurality of signals including at least one direct current signal and at least one alternating current signal to produce a composite signal for providing a control function.

A further object of the invention is to provide a signal mixing circuit wherein a plurality of signals of different characteristics are added and demodulated to produce a control voltage, with the control voltage and a further direct current voltage being combined in a modulator circuit to produce a combined control voltage.

A feature of the invention is the provision of a system for combininng a direct current voltage and at least one alternating current voltage in a series input circuit, with the combined signal being applied to a demodulator which produces a control voltage which represents the individual signals combined.

A further feature of the invention is the provision of an input circuit wherein a first signal of a reference frequency and of substantially sinusoidal wave form, a second signal of the reference frequency and of substantially rectangular wave form, and a third direct current signal are added in series and applied to a demodulator formed by a transistor. A wave of the reference frequency is applied to the transistor demodulator and a direct current output signal is developed thereby which represents the three input signals.

Another feature of the invention is the provision of a control circuit for use in an automatic pilot wherein a plurality of input signals having different characteristics are added and applied to a demodulator which produces a direct current voltage for controlling an element of an aircraft, and the direct current control voltage so produced and a feedback or follow-up direct current voltage are applied to a pair of modulators which produce square waves which are out of phase with each other and are combined to provide an output control voltage. The output control voltage may be used to control a servo for operating the elevators or the ailerons of the aircraft, and the feedback voltage may be controlled by the servo to counteract the control voltage.

The invention is illustrated in the accompanying drawings wherein.

In practicing the invention there is provided a control system wherein a plurality of control signals are combined to provide a single control voltage which represents the individual signals in the proper relation. The system may be used in an automatic pilot device for an aircraft for controlling the pitch and for the roll of the aircraft. For example, it may be used to control the roll of the craft through operation of a servo which adjusts the position of the ailerons. Control signals are obtained from a gyro provided in the craft, from radio equipment in the craft, and by other automatic and manual controls which may be set by the operator of the craft. The signals from the gyro are generally sinusoidal in wave form at a reference frequency which may be 400 cycles per second, which is the frequency of the power supply generally used. The signals from the radio equipment, which are provided through an approach coupler, may be alternating current signals at the reference frequency and of generally rectangular wave form and/or may be direct current signals. Signals from manual controls may include direct current voltages from turn and roll trim controls. These voltages are all added in a series circuit and applied to the emitter electrode of a transistor demodulator or switch. A wave at the reference frequency is applied to the base of the transistor and it acts as a switch and conducts during half of each cycle. A capacitor is connected to the collector electrode of the transistor across which a direct current output voltage is developed as the capacitor is charged during the half cycle when the transistor conducts.

The output voltage may be used to operate a servo which moves elements of the aircraft such as the ailerons or the elevators. A direct current follow-up voltage is provided by a velocity generator in accordance with movement of the servo. These direct current voltages are applied to a pair of modulators to which the reference wave is applied in opposite phases. The modulators produce square waves which are 180° out of phase, and these are combined with the portions of like polarity interspersed to produce a substantially continuous direct current signal. The alternating current component of the resultant signal is amplified and used to control the servo. When the voltage from the velocity generator corresponds to that from the demodulator there is no alternating current component and the servo remains in position.

Figure 1:
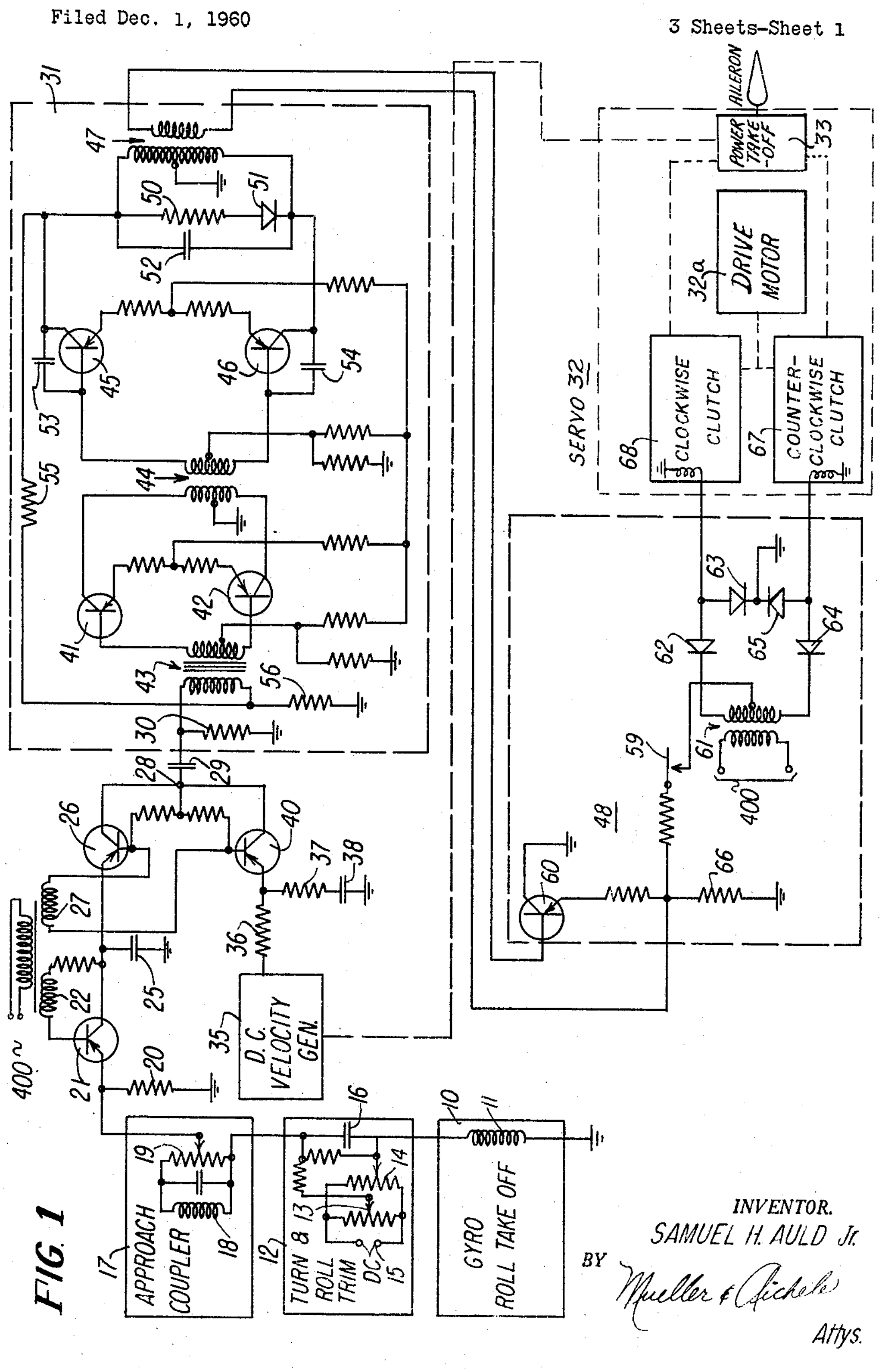
FIG. 1 is a circuit diagram illustrating the system of the invention.

Referring now to the drawings in FIG. 1 there is shown schematically the system of the invention in the roll channel of an automatic pilot for operation of the ailerons of an aircraft. A gyro device 10 has a winding 11 for taking off a roll signal which indicates the bank or roll of the aircraft. This may be part of a three axis gyro which in addition to indicating the roll, also indicates the pitch and heading of the craft. The signal from the pick-off may be of generally sinusoidal wave form and at a frequency of 400 cycles per second and is proportioned in amplitude and phase to the degree and direction of the aircraft deviation about the roll axis.

A controller 12 is provided in the aircraft to permit the operator to set various controls as desired, and this includes a turn control and a roll trim control. The turn control adjusts potentiometer 13 and the roll trim control adjusts potentiometer 14. These are connected across a D.C. voltage applied at the terminals 15. The resulting direct current voltage is developed across capacitor 16.

An approach coupler 17 is also provided in the aircraft to control the auto pilot from signals received by radio equipment in the aircraft. The output signal is provided from an amplifier to winding 18 and the desired level is obtained by potentiometer 19. The signals from the approach coupler are of generally rectangular wave form and at a frequency of 400 cycles per second and is proportioned in magnitude and phase to the right-left displacement of the aircraft about a VOR or localizer radio beam.

The voltages from the winding 11, the capacitor 16 and the potentiometer 19 are all added in series and developed across resistor 20. This voltage is applied to the emitter electrode of transistor 21 which functions as a demodulator or switch. A reference wave at 400 cycles per second is applied through transformer winding 22 to the base electrode of transistor 21 and serves as a demodulating wave for the applied signal. The reference wave causes the transistor 21 to conduct during half of the cycle and the transistor therefore acts as a switch to transfer the applied voltage during half of each cycle to the collector electrode and to capacitor 25. This capacitor retains the voltage developed thereacross between conductive half cycles of the transistor 21 to provide a composite output signal.

The composite signal may be used to control a servo to position the ailerons of the aircraft and may be combined with a signal derived from the servo to produce an error signal which indicates the movement of the servo required. The voltage across capacitor 25 is applied to transistor 26 which functions as a modulator and is rendered conducting during half of each cycle by the voltage applied to the base electrode thereof from transformer winding 27. The windings 22 and 27 of the transformer are connected with polarity so that the transistor 26 conducts while the transistor 21 does not conduct and vice versa. Accordingly the voltage developed across capacitor 25 when transistor 21 conducts, and which is applied to the emitter electrode of transistor 26, is conducted to the collector electrode thereof and provides a square wave output voltage at point 28.

Connected to the roll axis servo 32, which includes drive motor 32*a*, power takeoff 33, and clutches 67 and 68, is a direct current velocity generator 35 which produces an output voltage in response to the movement of the element of the aircraft being controlled, such as the aileron in FIG. 1. The direct current voltage is applied through resistor 36 and across resistor 37 and capacitor 38. This circuit produces an integrating effect as fully described and claimed in my copending application Serial No. 72,913, filed December 1, 1960. The portion of the voltage across resistor 37 and capacitor 38 is applied to the emitter electrode of transistor 40 which functions as a modulator. The reference wave is applied to the base electrode of transistor 40 through winding 27. Inasmuch as transistors 26 and 40 are connected to the opposite ends of the windings 27, they are rendered conducting during alternate half cycles of the wave applied thereby. The collector electrode of transistor 40 is also connected to point 28 and applies a square wave output voltage thereto.

The square wave voltages produced by transistors 26 and 40 are 180° out of phase, and at point 28 are in effect pulses interspersed with each other. When there is a difference in amplitude of the square wave pulses, this will produce an alternating current component which forms an error signal which is applied through capacitor 29 to amplifier 31. This activates the roll axis servo 32 to adjust the positions of the ailerons as will be described. This will also be applied to the velocity generator 35 which will change its output as the servo moves. When the square waves from transistors 26 and 40 are of equal amplitude, the result is a constant direct current voltage which has no alternating current component. Point 28 is coupled to amplifier 31 by capacitor 29 and under such conditions no voltage will be applied to the amplifier 31. This condition is reached when the servo is in the desired position.

The amplifier 31 includes two-push-pull stages and provides high gain. The first push-pull stage includes transistors 41 and 42 to which signals are applied by transformer 43. The output of the first stage is applied through transformer 44 to the output transistors 45 and 46. The output of the amplifier is applied through transformer 47 to a power demodulator circuit 48. As will be further explained, the demodulator conducts only during negative half cycles of the output voltage. This causes the reflected load across the primary of transformer 47 to vary within wide limits from one one-half cycle to the other. To compensate for this variation, resistor 50 and rectifier 51 are bridged across the primary winding. The rectifier 51 effectively connects resistor 50 in the circuit when the demodulator is not conducting, and disconnects the resistor when the demodulator is conducting. The resistor therefore tends to compensate for the load of the demodulator and provides a constant load for the amplifier during both half cycles of operation. Capacitor 52 is connected across the primary winding to tune the primary winding to 400 cycles and this acts as a low pass filter for the high frequency transients generated by the square wave input signal applied to the amplifier.

Capacitors 53 and 54, connected between the base and collector electrodes of the transistors 45 and 46 respectively, eliminate high frequency regeneration in the transistors by providing negative collector to base feedback that increases with frequency. In order to maintain the input impedance of the amplifier at a high level, a feedback circuit is provided from the collector electrode of transistor 45 through resistor 55 and 56 to the input winding of transformer 43.

The power demodulator circuit 48 includes transistor 60, transformer 61 and rectifiers 62, 63, 64 and 65. Contacts 59 are actuated by a relay when the autopilot is in operation to complete the circuit from resistor 66 to the center tap of the secondary winding of transformer 61. The square wave output of the amplifier 31 is applied across the base-emitter electrodes of the transistor 60. The 400 cycle reference voltage is applied to the input of transformer 61. The rectifiers 62 and 64 form a balanced detector circuit and each rectifier passes one-half cycle of the reference voltage.

The transistor 60 unbalances the circuit by effectively short circuiting resistor 66 during the negative half cycle of the amplifier output. When the amplifier output is in phase with the reference voltage this produces a heavy current through rectifier 64 and clutch 67 which is coupled to the servo motor to produce counter-clockwise rotation. When the amplifier output voltage is 180° out of phase with the reference voltages, the unbalance produces heavy current through rectifier 62 and clutch 68 which produces clockwise rotation of the drive motor 32*a*. Clutches 67 and 68 may be of the type described in Patent 2,772,761, and when current is applied to the windings thereof they become energized to couple drive motor 32*a* to the aircraft control surfaces through power takeoff 33. As is conventional practice, motor 32*a* rotates continuously and the direction of movement of control surfaces of the aircraft depends upon which one of clutches 67 and 68 is energized. Velocity generator 35 is mechanically coupled to power takeoff 33, which is rotated in either direction depending on which one of clutches 67 or 68 is energized, and responds thereto to produce a follow-up voltage across resistor 37 and capacitor 38. The current to the clutches is continued during the alternate half cycles by action of the rectifiers 63 and 65. When rectifier 62 is cut off and rectifier 64 conducts, rectifier 63 provides a path to ground for the back voltage generated in the excitation winding of clutch 68 during the proceeding half cycle of current. This maintains the current flow and holds the clutch 68 operated over the complete cycle of the reference voltage. Similar action takes place in clutch 67 when current is applied thereto by rectifier 64 as when rectifier 64 is nonconducting, current returns through rectifier 65.

Figure 2:
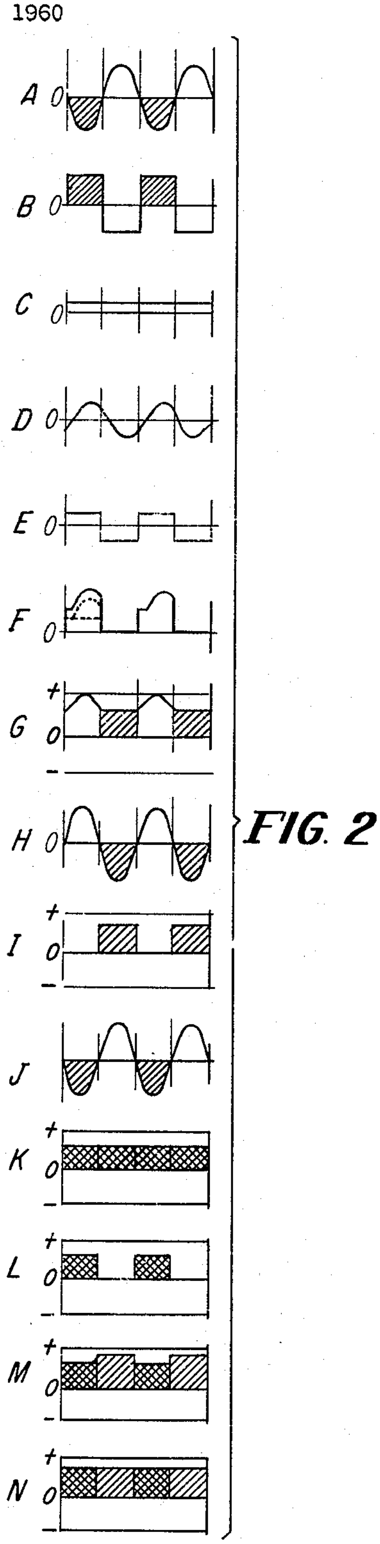
FIG. 2 is a chart showing the operation of the system of FIG. 1.

The operation of the system of FIG. 1 will be clearly understood from a consideration of the curves of FIG. 2. Curve A shows the reference signal which as stated above may be a 400 cycle power supply voltage. Curve B shows the switching action resulting from the reference voltage when applied to transistor 21, with the shaded areas showing the period of conduction. Curve C illustrates the direct current potential provided by the turn and roll trim controls which is developed across capacitor 16. Curve D is the sinusoidal signal produced by the roll takeoff element 11 of the gyro. It will be noted that this lags the reference wave by the order of 30°. Curve E shows the voltage obtained from the approach coupler, and although this is of generally rectangular wave form, it may not be a pure square wave. Curve F shows the voltage developed at the collector of transistor 21, and is the resultant produced by the switching action illustrated by curve B with the combined voltages shown by curves C, D and E being applied to the emitter electrode. Curve G shows the voltage developed across capacitor 25, with this capacitor being charged when transistor 21 conducts and retaining the change between the nonconducting half cycles.

As previously stated, the voltage across capacitor 25 is applied to the emitter electrode of transistor 26. Curve H illustrates the reference voltage applied to transistor 26, with the shaded areas showing the period of conduction. It will be noted that curve H is of opposite polarity to curve A showing that the transistor 26 conducts during the alternate half cycles as compared to the transistor 21. Curve I shows the voltage developed across capacitor 29 during the half cycles when the transistor 26 conducts. The voltage from the velocity generator 35 is shown by curve K. This voltage is applied to the emitter electrode of transistor 40 which is rendered conducting during half of each cycle by action of the wave applied to the base thereof which is shown by curve J. It will be apparent from a comparison of curves H and J that transistor 40 conducts during the opposite half cycle as compared to transistor 26. The output at the collector electrode of transistor 40, and which is developed across capacitor 29, is shown by curve L.

By comparing curves I and L it will be noted that the rectangular waves are 180° out of phase and in effect the square waves form pulses which are interspersed with each other. Curve M shows the combined voltage wave in the condition wherein the voltage from the velocity generator is less than that produced by the control signal. This produces an alternating current error signal which will operate the servo and cause the generator 35 to produce a voltage. Curve N shows the combined voltage waves for the condition that the velocity generator produces a voltage of the same value as that produced across capacitor 25. As the servo moves the aileron of the aircraft the gyro will respond and the signal therefrom will change. This will normally reduce the composite signal and reduce the pulses of curve I. The voltage from generator 35 will continue due to the integrating action of capacitor 38. This may cause the pulses of curve L to be greater than the pulses of curve I to reverse the servo and return the aircraft back to a desired course.

Figure 3:
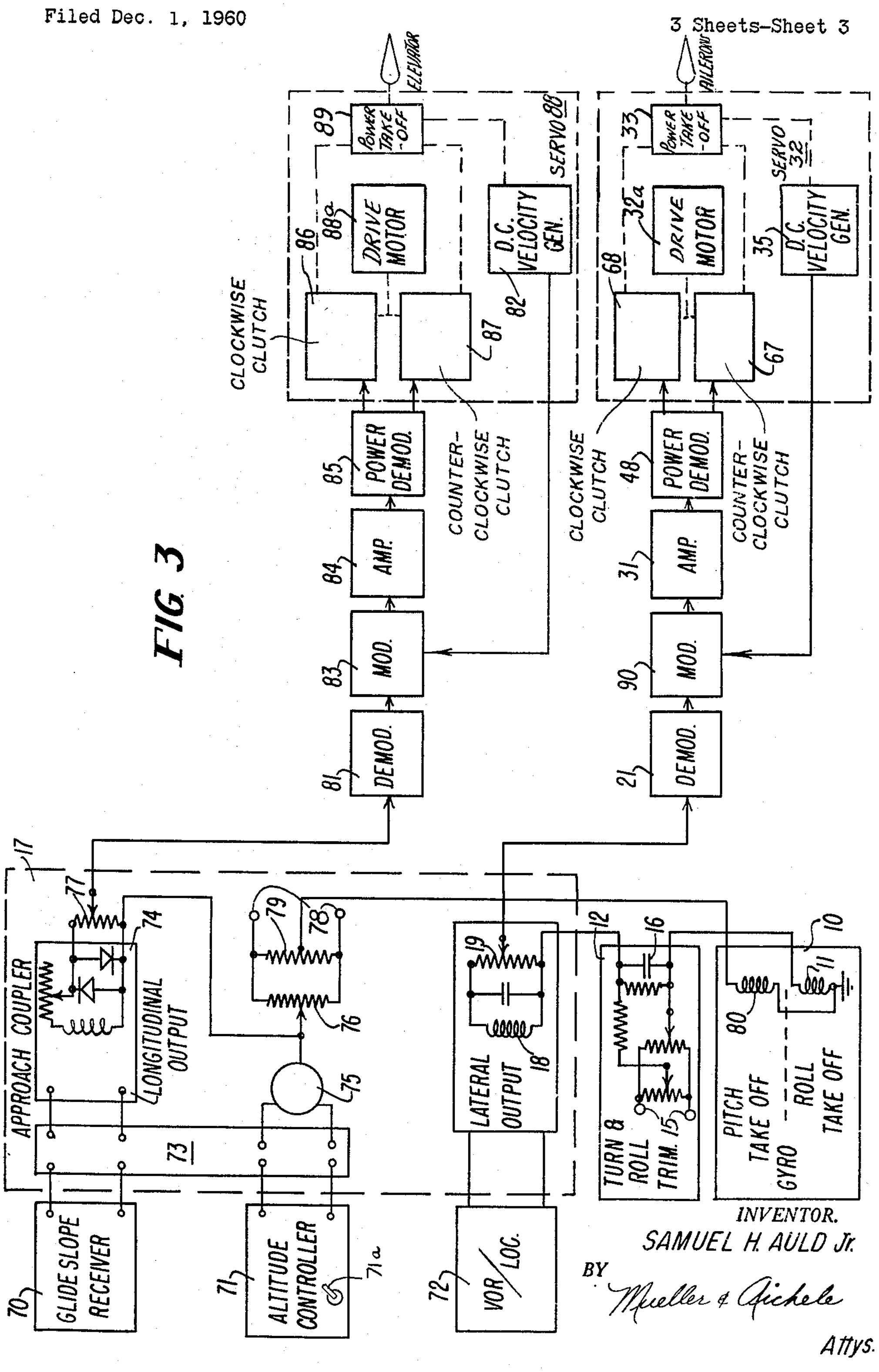
FIG. 3 is a schematic diagram showing the use of the system in the pitch channel and the roll channel of an automatic pilot.

FIG. 3 illustrates how the system shown in FIG. 1 may be used in both the pitch and roll channels of an automatic pilot. In this system the approach coupler 17 is supplied with signals from a glide slope receiver 70, an altitude controller 71, and a VOR or localizer receiving unit 72. Signals from the glide slope receiver 70 and altitude controller 71 are applied to a unit 73 which supplies a longitudinal output circuit 74, and a servo motor 75 for controlling a trim potentiometer 76. The circuit 74 produces a generally square wave output at 400 cycles per second across potentiometer 77 which represents the displacement of the aircraft in altitude, either with respect to the glide slope beam, or an altitude set on the altitude controller. The trim potentiometer 76 produces a D.C. signal from the D.C. input 78 by action of the potentiometer 77 and the resistor divider 79. This is a pitch command signal and may be controlled in part by a manual altitude control 71*a*, which may be provided with the altitude controller 71. The approach coupler also has a lateral output providing signals from the amplifier output transformer 18 to potentiometer 19 as illustrated in FIG. 1.

The controller 12 provides a direct current potential across condenser 16 from the turn and roll trim controls as described in connection with FIG. 1. The gyro 10 as shown includes the roll take-off winding as shown in FIG. 1, and also a pitch take-off winding 80. As previously stated the gyro may be a three axis gyro providing roll, pitch and heading signals.

For the pitch channel, signals from the pitch take-off coil 80 are combined with direct current pitch command signals from the trim potentiometer 76 and the longitudinal output derived from potentiometer 77. The combined signals are applied to demodulator 81 which is generally similar to the demodulator formed by transistor 21 of FIG. 1. The output of the demodulator 81 and signals from the D.C. velocity generator 82 are applied to a modulator 83 which may be generally similar to the modulator formed by transistors 26 and 40 of FIG. 1. The output of the modulator is applied to an amplifier 84 which corresponds to amplifier 31 of FIG. 1. The amplified output is applied to power demodulator 85 which controls clutches 86 and 87 which in turn control drive motor 88*a* of servo 88. This servo motor is coupled to the elevators 89 of the aircraft to control the same to thereby control the pitch of the aircraft. The velocity generator 82 operates to provide a follow-up signal which is combined with the control signal in the modulator 83. The various elements provide the same functions and cooperate in the same way as in the system of FIG. 1.

The roll channel of FIG. 3 is exactly the same as described in connection with FIG. 1. Signals from the take-off gyro coil 11, the capacitor 16 of the controller, and the potentiometer 19 of the approach coupler are fed to the demodulator identified as 21 (this includes the transistor 21 of FIG. 1). Signals from the demodulator 21 and the velocity generator 35 are applied to the roll channel modulator 90 which corresponds to the modulator including the transistors 26 and 40 of FIG. 1. The error signal is amplified in amplifier 31 and applied to power demodulator 48 to control clutches 67 and 68. These clutches in turn control servo motor 32 which operates the ailerons as has been fully described.

The system described is therefore applicable in various different systems wherein control signals of different characteristics provide joint control of an element. Although the system has been described in connection with the roll and pitch channels of an automatic pilot, it is obviously suitable for many other applications. The signals are directly applied so that the possibility that the signals are not combined with the right relative values is minimized. The circuit for combining signals to produce a composite output signal is extremely simple requiring a single transistor. Further, the use of such signal in combination with a follow-up voltage for controlling a servo which positions a movable element is accomplished in a simple overall circuit.

I claim:

1. A circuit for combining signals from a plurality of sources including in combination, an input circuit including a first input portion for a signal of a reference frequency and of generally sinusoidal wave form, a second input portion for a signal of said reference frequency and of generally rectangular wave form, and a third input portion for a direct current signal, said input portions being connected in series in said input circuit whereby said signals are combined therein, demodulator means, means for applying a wave of said reference frequency to said demodulator means to cause the same to conduct during alternate half cycles of the reference wave, and means applying the combined signal from said input circuit to said demodulator means, said demodulator means including output means for producing a direct current voltage having a value which varies with the combined signals.

2. A circuit for combining signals from a plurality of sources including in combination, an input circuit including a first input portion for an alternating current signal of a reference frequency and a second input portion for a direct current signal, said input portions being connected in series in said input circuit whereby said signals are combined therein, demodulator means, means for applying a wave of said reference frequency to said demodulator means to cause the same to conduct during alternate half cycles of the reference wave, and means applying the combined signal from said input circuit to said demodulator means, said demodulator means including capacitor means across which is produced a direct current voltage having a value which varies with the combined signals.

3. A circuit for combining signals from a plurality of sources including in combination, an input circuit including a first input portion for an alternating current signal of a reference frequency and a second input portion for a direct current signal, said input portions being connected in series in said input circuit whereby said signals are combined therein, demodulator means including a transistor having first, second and third electrodes, means applying the combined signal from said input circuit to said first electrode, means applying a wave of said reference frequency between said second and third electrodes whereby conduction takes place between said first and third electrodes during alternate half cycles of said reference wave, and output means connected to said third electrode across which a direct current voltage is developed having a value which varies with the combined signals.

4. A circuit for combining signals from a plurality of sources including in combination, an input circuit including a first input portion for a signal of reference frequency and of generally sinusoidal wave form, a second input portion for a signal of said reference frequency and of generally rectangular wave form, and a third input portion for a direct current signal, said input portions being connected in series in said input circuit whereby said signals are combined therein, demodulator means including a transistor having first, second and third electrodes, means applying the combined signal from said input circuit to said first electrode, means applying a wave of said reference frequency between said second and third electrodes whereby conduction takes place between said first and third electrodes during alternate half cycles of said reference wave, and capacitor means connected to said third electrode across which a direct current voltage is developed having a value which varies with the combined signals.

5. A circuit for combining signals from a plurality of sources to provide a signal for operating control means including in combination, an input circuit including a first input portion for a signal of a reference frequency and of generally sinusoidal wave form, a second input portion for a signal of said reference frequency and of generally rectangular wave form, and a third input portion for a direct current signal, said input portions being connected in series in said input circuit whereby said signals are combined therein, demodulator means to which a wave of said reference frequency is applied, means applying the combined signal from said input circuit to said demodulator circuit, said demodulator means including means providing a direct current voltage which varies with the combined signals, first modulator means to which a wave of said reference frequency is applied, means applying said direct current voltage to said modulator means whereby said modulator means produces a first square wave at said reference frequency and having portions of one polarity with an amplitude which varies with the combined signals, a fourth input portion for a further direct current signal, second modulator means to which a wave of said reference frequency is applied which is of opposite phase to the wave applied to said first modulator means, means applying the further direct current signal to said second modulator means whereby said second modulator means produces a second square wave at said reference frequency and having portions of said one polarity with an amplitude which varies with the further direct current signal, means for combining said first and second square waves with said portions thereof being interspersed, and alternating current coupling means for applying said combined wave signals to the control means.

6. A circuit for combining signals from a plurality of sources to provide a signal for controlling servo means including in combination, an input circuit including a first input portion for an alternating current signal of a reference frequency and a second input portion for a direct current signal, said input portions being connected in series in said input circuit whereby said signals are combined therein, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied whereby said modulator means produce square wave outputs at said reference frequency, means applying said direct current voltage to said first modulator means, means for combining said square wave outputs from said first and second modulator means with the portions thereof of the same polarity being interspersed with each other, control means for the servo means, alternating current coupling means for applying said combined square wave outputs to said control means, generator means coupled to the servo means for producing a voltage responsive to the velocity of movement thereof, means applying said voltage from said generator to said second modulator means, whereby the combined signals of said first and second modulator means is a square wave at said reference frequency representing the difference between said direct current voltage and said voltage from said generator.

7. A circuit for combining signals from a plurality of sources to provide a signal for controlling servo means including in combination, an input circuit including a first input portion for an alternating current signal of a reference frequency and a second input portion for a direct current signal, said input portions being connected in series in said input circuit whereby said signals are combined therein, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied so that said modulator means produce square wave outputs at said reference frequency, means applying said direct current voltage to said first modulator means, generator means coupled to the servo means for producing a voltage responsive to the velocity of movement thereof, means applying said voltage from said generator to said second modulator means, means for combining said square wave outputs from said first and second modulator means with the portions thereof of the same polarity being interspersed with each other, the combined signals of said first and second modulator means producing a square wave at said reference frequency representing the difference between said direct current voltage and said voltage from said generator, control means for the servo means, alternating current coupling means for applying said combined square wave outputs to said control means for controlling the servo means.

8. In an automatic pilot system for an aircraft, a circuit for combining signals from a plurality of sources to provide a signal for controlling servo means for operating an element of the aircraft including in combination, an input circuit including a first input portion adapted to be coupled to radio equipment on the aircraft which produces an alternating current signal of a reference frequency, and a second input portion adapted to be coupled to a controller which provides a direct current signal, said input portions being connected in series in said input circuit whereby said signals are combined therein, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied so that said modulator means produce square wave outputs at said reference frequency, means applying said direct current voltage to said first modulator means, generator means coupled to the servo means for producing a voltage responsive to the velocity of movement thereof, means applying said voltage from said generator to said second modulator means, means for combining said square wave outputs from said first and second modulator means with the portions thereof of the same polarity being interspersed with each other, the combined signals of said first and second modulator means producing a square wave at said reference frequency representing the difference between said direct current voltage and said voltage from said generator, control means for the servo means, alternating current coupling means for applying said combined square wave outputs to said control means for controlling the servo means.

9. In an automatic pilot system for an aircraft, a circuit for combining signals from a plurality of sources to provide a signal for controlling servo means for operating an element of the aircraft including in combination, an input circuit including a first input portion adapted to be coupled to gyro equipment on the aircraft which produces an alternating current signal of a reference, and a second input portion adapted to be coupled to means on the aircraft which provides a direct current signal, said input portions being connected in series in said input circut whereby said signals are combined therein, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied so that said modulator means produce square wave outputs at said reference frequency, means applying said direct current voltage to said first modulator means, generator means coupled to the servo means for producing a voltage responsive to the velocity of movement thereof, means applying said voltage from said generator to said second modulator means, means for combining said square wave outputs from said first and second modulator means with the portions thereof of the same polarity being interspersed with each other, the combined signals of said first and second modulator means producing an error signal at said reference frequency representing the difference between said direct current voltage and said voltage from said generator, control means for the servo means, alternating current coupling means for applying said error signal to said control means for controlling the servo means.

10. In automatic pilot equipment for an aircraft which includes a gyro providing a signal of a reference frequency and of generally sinusoidal wave form, radio equipment providing a signal of said reference frequency and of generally rectangular wave form, a controller providing a direct current signal, and servo means for controlling an element of the aircraft; a system for controlling the servo means including in combination, an input circuit having portions coupled to the gyro, to the radio equipment and to the controller and which combines signals therefrom, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied whereby said modulator means produce square wave outputs at said reference frequency, means applying said direct current voltage to said first modulator means, generator means coupled to the servo means for producing a voltage responsive to the velocity of movement thereof, means applying said voltage to said second modulator means, means for combining said square wave outputs from said first and second modulator means with the portions of the same polarity being interspersed, whereby the combined signal of said first and second modulator means forms an error signal at said reference frequency representing the difference between said direct current voltage and said voltage from said generator, control means for the servo means, and alternating current coupling means for applying said error signal to said control means for controlling said servo means.

11. In an automatic pilot equipment for an aircraft which includes a gyro providing a signal of a reference frequency and of generally sinusoidal wave form which represents the roll of the aircraft, radio equipment providing a signal of said reference frequency and of generally rectangular wave form which represents the lateral displacement of the aircraft, a turn and roll trim controller providing a direct current signal, and servo means for controlling the ailerons of the aircraft, a system for controlling the servo means including in combination, an input circuit having portions coupled to the gyro, to the radio equipment and to the controller and which combines signals therefrom, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied whereby said modulator means produce square wave outputs at said reference frequency, means applying said direct current voltage to said first modulator means, means for combining said square wave outputs from said first and second modulator means with the portions of the same polarity being interspersed, control means for the servo means, alternating current coupling means for applying said combined square wave outputs to said control means, generator means coupled to the servo means for producing a voltage responsive to the velocity of movement thereof, means applying said voltage to said second modulator means, whereby the combined signal of said first and second modulator means forms an error signal at said reference frequency representing the difference between said direct current voltage and said voltage from said generator, and said error signal controls the position of the ailerons of the aircraft through action of said control means and the servo means.

12. In an automatic pilot equipment for an aircraft which includes a gyro providing a signal of a reference frequency and of generally sinusoidal wave form which represents the pitch of the aircraft, radio equipment providing a signal of said reference frequency and of generally rectangular wave form which represents the displacement of the aircraft in altitude, a controller providing a direct current signal representing pitch command, and servo means for controlling the elevators of the aircraft, a system for controlling the servo means including in combination, an input circuit having portions coupled to the gyro, to the radio equipment and to the controller and which combines signals therefrom, demodulator means to which a wave of said reference frequency is applied, means applying the combined signal from said input circuit to said demodulator means, said demodulator means including means providing a direct current voltage which varies with the combined signals, first and second modulator means to which waves of said reference frequency and of opposite phases are applied whereby said modulator means produce square wave outputs at said reference frequency, means applying said direct current voltage to said first modulator means, means for combining said square wave outputs from said first and second modulator means with the portions of the same polarity being interspersed, control means for the servo means, alternating current coupling means for applying said combined square wave outputs to said control means, generator means coupled to the servo means for producing a voltage responsive to the velocity of movement thereof, means applying said voltage to said second modulator means, whereby the combined signal of said first and second modulator means forms an error signal at said reference frequency representing the difference between said direct current voltage and said voltage from said generator, and said error signal controls the position of the elevators of the aircraft through action of said control means and the servo means.

References Cited in the file of this patent

UNITED STATES PATENTS

| | | |
|---|---|---|
| 2,602,161 | Proskauer | July 1, 1952 |
| 2,613,350 | Kellogg | Oct. 7, 1952 |
| 2,785,306 | Johnson et al. | Mar. 12, 1957 |
| 2,932,794 | Crow | Apr. 12, 1960 |
| 2,953,752 | Porter | Sept. 20, 1960 |

OTHER REFERENCES

Electronics Magazine, April 1955, "Transistor Choppers for Stable D.C. Amplifiers" (pages 135–137).